(12) United States Patent
Silva et al.

(10) Patent No.: US 11,210,108 B2
(45) Date of Patent: Dec. 28, 2021

(54) GUIDING THE INSTALLATION PROCESS OF SENSOR-BASED DEVICES

(71) Applicant: International Business Machines Corporation, Armonk, NY (US)

(72) Inventors: Bruno Silva, São Paulo (BR); Renato Luiz de Freitas Cunha, São Paulo (BR); Marco Aurelio Stelmar Netto, São Paulo (BR); Vagner Figueredo de Santana, São Paulo (BR); Fernando Luiz Koch, Greenwich, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 19 days.

(21) Appl. No.: 16/786,163

(22) Filed: Feb. 10, 2020

(65) Prior Publication Data

US 2021/0247989 A1    Aug. 12, 2021

(51) Int. Cl.
*G06F 9/44* (2018.01)
*G06F 9/445* (2018.01)

(52) U.S. Cl.
CPC ............................... *G06F 9/44505* (2013.01)

(58) Field of Classification Search
CPC ..... G06F 1/32; G06F 1/28; G06F 1/12; G06F 9/44
See application file for complete search history.

(56) References Cited

U.S. PATENT DOCUMENTS

| 7,117,160 B1* | 10/2006 | Haynes | G06Q 10/06 |
| | | | 705/7.13 |
| 7,324,081 B2 | 1/2008 | Friedrich et al. | |
| 9,367,300 B2 | 6/2016 | Ohtake et al. | |
| 10,096,236 B1* | 10/2018 | Trundle | G08B 29/185 |
| 2009/0055854 A1* | 2/2009 | Wright | H04H 60/43 |
| | | | 725/14 |
| 2012/0123823 A1* | 5/2012 | Finkelstein | G06Q 30/02 |
| | | | 705/7.32 |
| 2014/0245279 A1 | 8/2014 | Ohtake et al. | |
| 2016/0117863 A1 | 4/2016 | Pugazhendhi et al. | |
| 2016/0298950 A1* | 10/2016 | Modi | G08B 29/22 |
| 2016/0299750 A1 | 10/2016 | Koniges et al. | |
| 2018/0285130 A1 | 10/2018 | Chakra et al. | |
| 2018/0321951 A1 | 11/2018 | Fitzgerald et al. | |

FOREIGN PATENT DOCUMENTS

JP    5679074 B2    3/2015

* cited by examiner

*Primary Examiner* — Keshab R Pandey
(74) *Attorney, Agent, or Firm* — Cantor Colburn LLP; Joseph Petrokaitis

(57) ABSTRACT

Aspects of the invention include a computer-implemented method, which includes retrieving an installation protocol for a sensor-based device. Receiving negative feedback data representing negative feedback about directions for a step in the installation protocol. Performing an installation analysis of an installation of the sensor-based device. Amending the directions, based at least in part on the installation analysis.

20 Claims, 6 Drawing Sheets

GUIDING THE INSTALLATION PROCESS OF SENSOR-BASED DEVICES

BACKGROUND

The present invention generally relates to programmable computers, and more specifically, to guiding the installation process of sensor-based devices.

Smart sensors/devices collect inputs from the physical environment and use connected computing resources to perform predefined functions upon detection of certain inputs; process data; and transmit the processed data to other computing devices. Smart sensor-based devices are integral to the Internet of Things (IoT), which refers to providing various real-world things, such as streets, buildings, security systems, and household appliances with sensing devices, connecting them through the Internet, so as to achieve remote control or direct communication between these real-world things. The IoT has connected real-world things from electronics to plant and animal wildlife, by means of radio frequency identifications (RFIDs), sensors, binary codes, and the like provided for various kinds of devices connected to wired/wireless networks via interfaces. As a result, all the real-world things can be monitored and operated through networking, and their behaviors can be programmed for human convenience.

SUMMARY

Embodiments of the present invention are directed to guiding an installation of a sensor-based device installation process. A non-limiting example computer-implemented method includes retrieving an installation protocol for a sensor-based device. Receiving negative feedback data representing negative feedback about directions for a step in the installation protocol. Performing an installation analysis of an installation of the sensor-based device. Amending the directions, based at least in part on the installation analysis.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer implemented methods and computer based systems for generating personalized installation protocols based on an installation circumstance.

The installation of sensor-based devices raises unique challenges not present during installation of conventional devices or fixtures. Sensor-based device installation requires, for example, attention to operable connectivity, hardware compatibility with the environment, a power source, absence of unwanted activation signals, and software capability. Technicians are generally provided an installation protocol for sensor-based devices. However, less experienced technicians may become confused with one or more steps of an installation protocol for a new or otherwise unfamiliar sensor-based device. Additionally, more experienced technicians may be unable to perform a step based on available resources. This may be particularly problematic with new sensor-based devices, where the installation protocols may have not been properly field-tested.

One or more embodiments of the present invention address one or more of the above-described shortcomings by providing computer implemented methods and computer based system that creates personalized installation protocols for sensor-based devices based on the circumstances of each installation. In the event that a step is confusing, or a technician lacks the necessary resources, the computer implemented methods and computer-based systems analyze stored installation protocols for similar sensor-based devices, and create a new personalized installation protocol for the technician(s).

Figure 1:
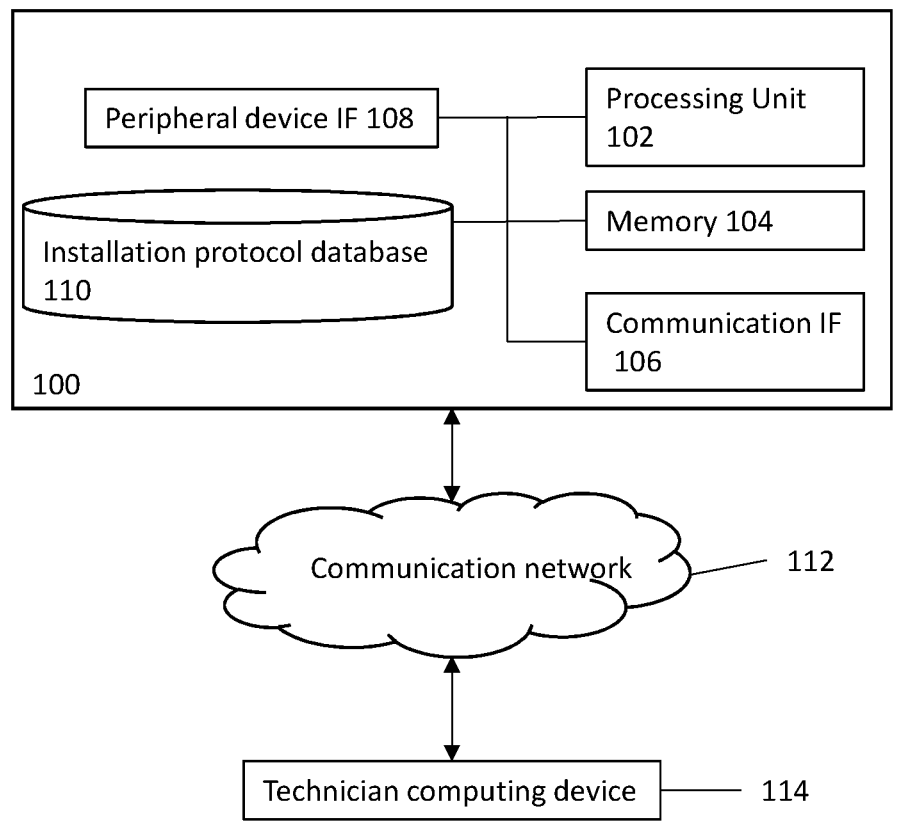
FIG. 1 illustrates a block diagram of components of personalized installation protocol system in accordance with one or more embodiments of the present invention.

Turning now to FIG. 1, a system 100 for personalized installation protocol creation is generally shown in accordance with one or more embodiments of the present invention. The system 100 includes a processor unit 102, memory device 104, communication interface 106, peripheral device interface 108, and an installation protocol database 110. The system 100 may also be in operable communication with a display device (not shown).

The processor unit 102 receives electronic manuals associated with sensor-based devices, and using natural language processing techniques generates an installation protocol for installing a sensor-based device (not shown). Each installation protocol includes a series of steps for installing the sensor-based device, in which each step results in the sensor-based device entering a new state. A sensor-based device state may include physical states, for example, a smart refrigerator being arranged within a kitchen. A state may also include an electrical state, for example, connection with a communication network, or having power. Each step may later be provided to a technician via a technician computing device 114 in the form of videos, text, audio, or a combination thereof. The system 100 may be local on the technician computing device 114 or on a server 50.

Upon each installation, the processor unit 102 receives an identity of the technician or technicians involved in the installation. The processor unit 102 further receives written feedback comments, and using NLP techniques determines a description of tasks performed by each technician and whether any step was particularly confusing or unhelpful. In addition to learning which directions were confusing or unhelpful, the technicians provide any hints or alternative methods used to move a sensor-based device from one state to the next. The hints may be in the form of a video, audio, or narrative text, a combination thereof, or any other appropriate method. The processor unit 102 also uses this information to count a number of installations and specific tasks performed by each technician. This assists the processor unit 102 to determine a level of experience of each technician and circumstance of installation.

The processor unit 102 also receives information identifying the sensor-based device to be installed. This includes any configuration files, schematics, models, descriptions of accompanying software or hardware, or other appropriate information. Based on this information, the processor unit 102 uses machine learning techniques to classify the sensor-based device, including determining similarities and differences in the sensor-based devices themselves and their installation protocols.

As used herein, "machine learning" broadly describes a function of electronic systems that learn from data. A machine learning system, engine, or module can include a machine learning algorithm that can be trained, such as in an external cloud environment (e.g., the cloud computing environment 50), to learn functional relationships between inputs and outputs that are currently unknown. In one or more embodiments, machine learning functionality can be implemented using an artificial neural network (ANN) having the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

The conclusions drawn using the machine learning techniques are further used to respectively cluster installation protocols in different groups based on sensor-based device features, installation steps, resources required for installation, level of expertise of technician, or other appropriate group.

The processor unit 102 further uses the clustered installation protocols to search for direction for steps similar to substitute for a confusing or unhelpful step direction. For example, the processor unit 102 may receive feedback that the directions for performing a particular step were confusing or unhelpful. In this situation, the processor unit 102 may respond with various actions. One response would be to find one or more clusters of installation protocols that include an installation protocol with the confusing directions. Then based on various techniques, for example, comparing a state prior to the step and a state after the step, statistical analysis, tools used, goals, determine if any comparable steps are included in the cluster. The processor unit 102 may then substitute the confusing directions for performing the step in the installation protocol with a less confusing direction for the step. A determination that the directions are less confusing may be based on a lack of negative feedback related to the directions for the step, or a total negative feedback less than a threshold level.

The processor unit 102 further performs installation analysis and correlates the negative feedback with the analysis. The processor unit 102 performs the installation analysis by determining, for example, an experience of the technician providing the feedback, the available resources during installation, the number of technicians, experience of different technicians in a group performing the installation. This information may be retrieved from, for example, an electronic work order, a company inventory, or from data input by the technicians in a computing system. It may be determined that technicians of different experience levels may not all provide negative feedback. For example, only technicians working alone provide negative feedback, or less experienced technicians provide the negative feedback. In these instances, the processor unit 102, would only update an installation protocol, if the circumstances of the installation were similar to the circumstances of other installations. In this sense, a respective installation protocol may be different for each installation.

Each confusing step may be stored in a separate database, and using the same or similar techniques used to determine similar steps, the processor unit 102 may determine that a similar direction for a step in another installation protocol is also confusing or unhelpful, and substitute it for another less confusing or more helpful direction.

The system 100 may further include a user transmission device (not shown) wherein the user transmission device may communicate installation protocol information, including electronic records that convey installation steps, sensor-based device confirmation files and firmware files, information related to installation steps, and other appropriate. A user transmission device may use one or more modes of a communication network 112 to reach a technician. A technician is any person responsible for the installation of a sensor-based device, and therefore can include an employee of a third party service provider, a company employee, or even a property owner. The user transmission device may further be configured to send e-mails, videos, audio files, text-based documents, figures, or other appropriate information to a technician.

The memory device 104 may be or include a device such as a Dynamic Random Access Memory (D-RAM), Static RAM (S-RAM), or other RAM or a flash memory.

The installation protocol database 110 may be or include a hard disk, a magneto-optical medium, an optical medium such as a CD-ROM, a digital versatile disk (DVDs), or BLU-RAY disc (BD), or other type of device for electronic data storage. The installation protocol database 110 stores installation related data, including, but not limited electronic installation manuals, image files, technician comments, video files, key/value pairs, and audio files.

The communication interface 106 may be, for example, a communications port, a wired transceiver, a wireless transceiver, and/or a network card. The communication interface 106 may be capable of communicating using technologies such as Ethernet, fiber optics, microwave, xDSL (Digital Subscriber Line), Wireless Local Area Network (WLAN) technology, wireless cellular technology, Bluetooth technology and/or any other appropriate technology.

The peripheral device interface 108 may be an interface configured to communicate with one or more peripheral devices. As an example, the peripheral device may communicate with an on-board diagnostics (OBD) unit that is associated with a vehicle. The peripheral device interface 108 may operate using a technology such as Universal Serial Bus (USB), PS/2, Bluetooth, infrared, serial port, parallel port, and/or other appropriate technology. The peripheral device interface 108 may, for example, receive input data from an input device such as a keyboard, a mouse, a trackball, a touch screen, a touch pad, a stylus pad, and/or other device.

Figure 2:
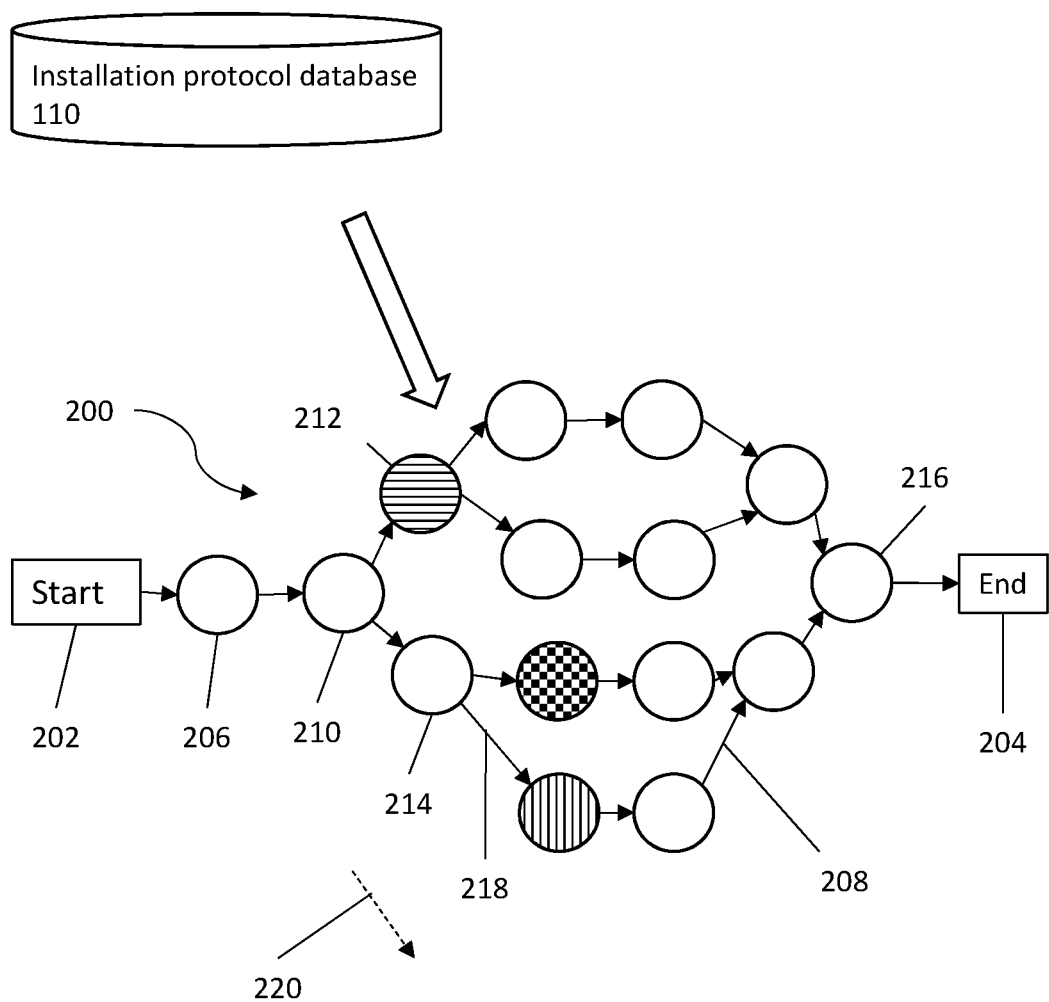
FIG. 2 illustrates a diagram of dependency graph of installation protocols in accordance with one or more embodiments of the present invention.

Referring to FIG. 2, a dependency graph representing a set of installation protocols 200 stored in the installation protocol database 110 is shown. Each set of installation protocols 200 includes a common start 202 and end for each potential installation protocol. Each potential path represents an installation protocol. As seen in FIG. 2, the dependency graph illustrates four potential installation protocols for installing a sensor-based device. The set of installation protocols 200 are formed from nodes 206 connected by edges 208. Each node 206 represents a state of the sensor-based device after a step has been completed. Each edge 208 represents a step required to move from one node to a following node. Each edge 208 is associated with a set of directions to complete the step.

A node may be followed by a single node, for example, a first node 206 is followed by only one second node 210. A node may also be followed by multiple nodes, for example, the second node 210 is followed by both a third node 212 and a fourth node 214. Options for a path divergence may be based on various factors, including available resources, experience, available time, costs, or other appropriate parameters. For example, the third node 212 may be a state that requires two or more technicians to continue. On the other hand, the fourth node 214 may describe a state of the sensor-based device that only requires a single technician to move forward. In one instance, the processor unit 102 may have received information that multiple technicians are installing the sensor-based device and would present the technicians with installation protocols that follow the paths using the third node 212 and the fourth node 214. However, in another instance, the processor unit 102 may have received information that one technician is installing the sensor-based device. In this instance, the processor unit 102 would only present installation protocols that include the fourth node 214. Edges may converge on nodes that are common to all installation protocols. For example, each installation protocol must end with the sensor based device in a completed state, and therefore all paths converge at a fifth node 216, which describes the sensor-based device in the completed state.

As described above, periodically the processor unit 102 will receive technician feedback that directions to complete a step are confusing or unhelpful and replace the directions with less confusing or more helpful directions. As illustrated in FIG. 2, the processor unit 102 may have received a threshold amount of negative feedback to determine that the directions for step 218 are confusing. In this instance, the processor unit 102 would search each installation protocol cluster to find a comparable step and replace the confusing directions associated with step 218, with less confusing directions for the step 220. It is also possible that a current technician has previously provided negative feedback on a similar directions to directions provide for the current installation. Upon learning an identity of a technician, the processor unit 102 may detect previous negative feedback stored on the memory device 104 or the installation protocol database 110. The processor unit 104 may then perform a comparative analysis on the installation protocol being provided or already provided to determine if there is any similarity between the previous direction with negative feedback and the current directions. This may be performed using various statistical methods and/or NLP. If the processor unit 104 determines that one or more directions of the current installation protocol match the previous directions with negative feedback, the processor unit 104 may replace the directions prior to sending the installation protocol or during the installation. It should be noted that the step is not being replaced, rather the direction for completing the step. In addition, or as an alternative, the processor unit 102 may include hints provided by technicians on how to complete the step.

Figure 3:
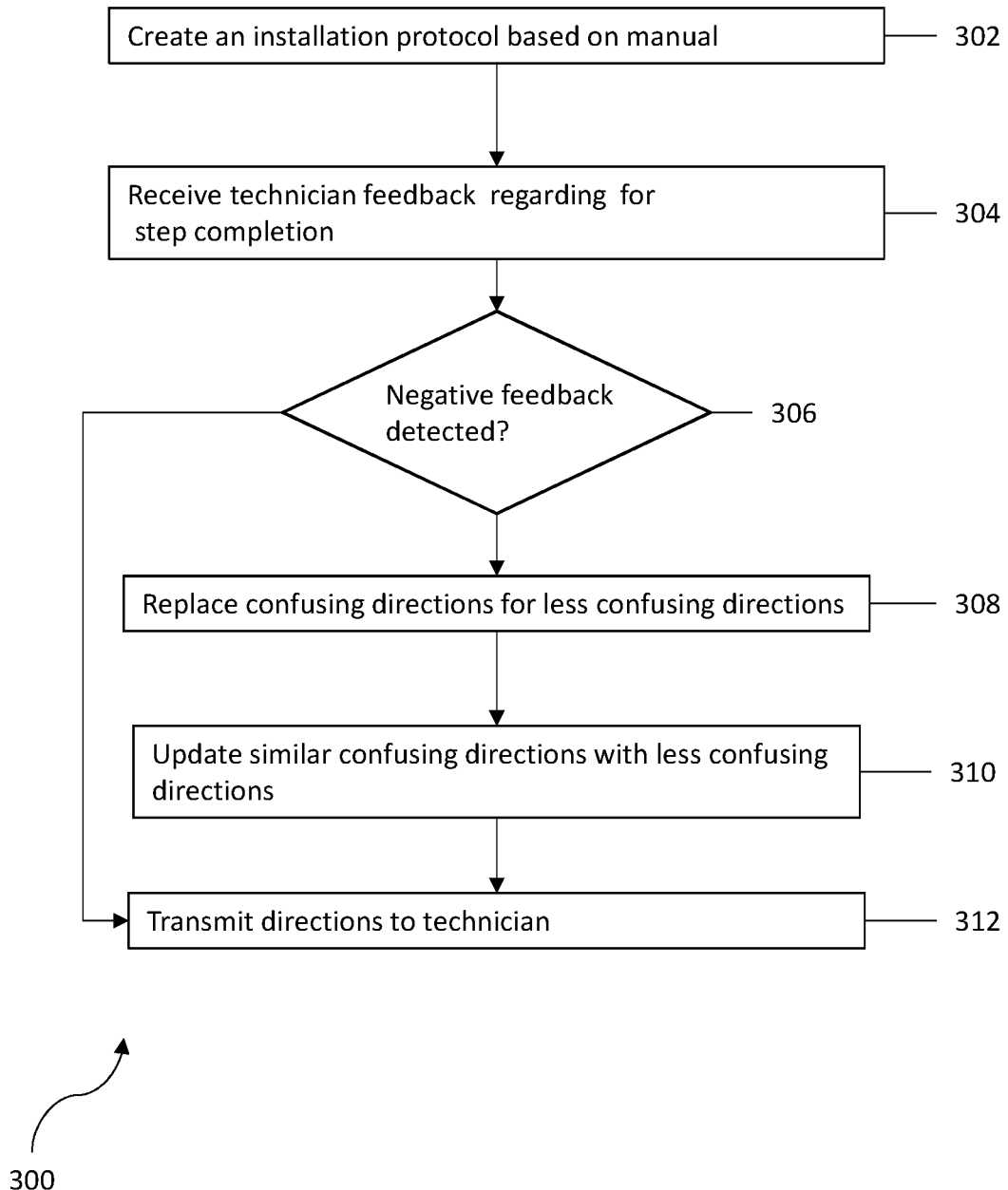
FIG. 3 illustrates a flow diagram of a process for creating a personalized installation protocol in accordance with one or more embodiments of the present invention.

Referring to FIG. 3, a flow diagram 300 of a process for creating a personalized installation protocol in accordance with one or more embodiments of the present invention is shown. At block 302 an installation protocol for installation of a sensor-based device is created. This may be performed, for example, through NLP techniques performed on electronic installation manuals or internet articles retrieved from a web crawler. Each time that a new installation protocol is created, common steps and states are detected to merge installation protocols into a set of installation protocols as illustrated in FIG. 2.

At block 304, feedback is retrieved from a technician following an installation protocol. The feedback may be received in real-time during the installation or upon completion of the installation. At block 306, a determination is made as to whether the feedback is negative. If no negative feedback is detected, the directions are in condition to transmit to a technician at block 312. If, however, negative feedback is detected, the directions for steps similar to the step with the negatively reviewed directions are found by searching installation protocols for similar sensor-based devices at block 308. The directions associated with the negative feedback are replaced with similar directions that have not received a threshold number of negative comments. In addition, hints may be provided along with the new directions. The hints may be in the form of video, audio, or textual narratives. This may be performed after the installation is complete or during the installation.

At block 310, steps with directions similar to the directions that received negative feedback are identified and replaced with directions not associated with negative feedback. At block 312, the directions are in condition to be transmitted to another technician.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
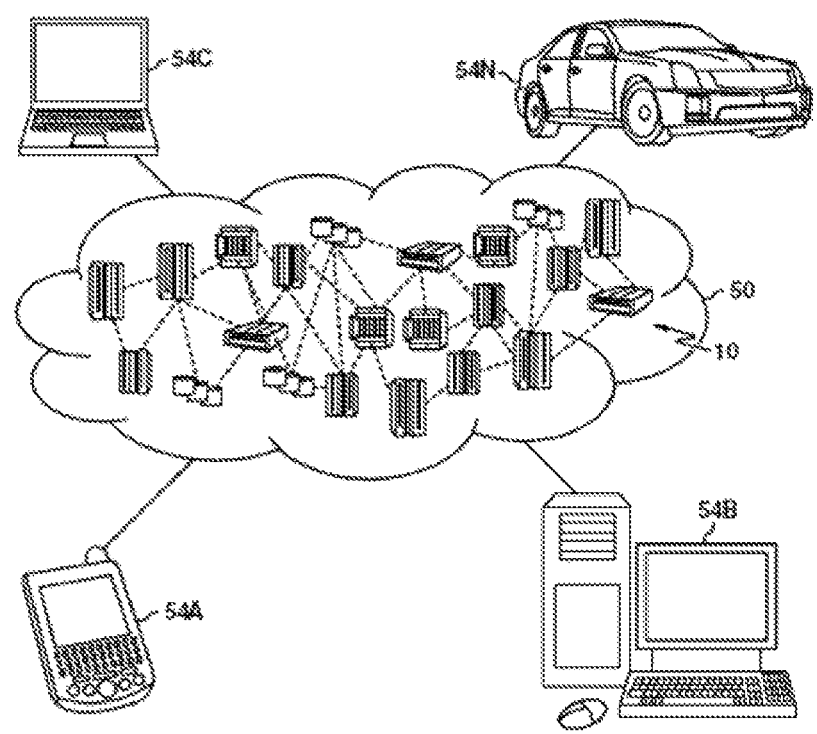
FIG. 4 depicts a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
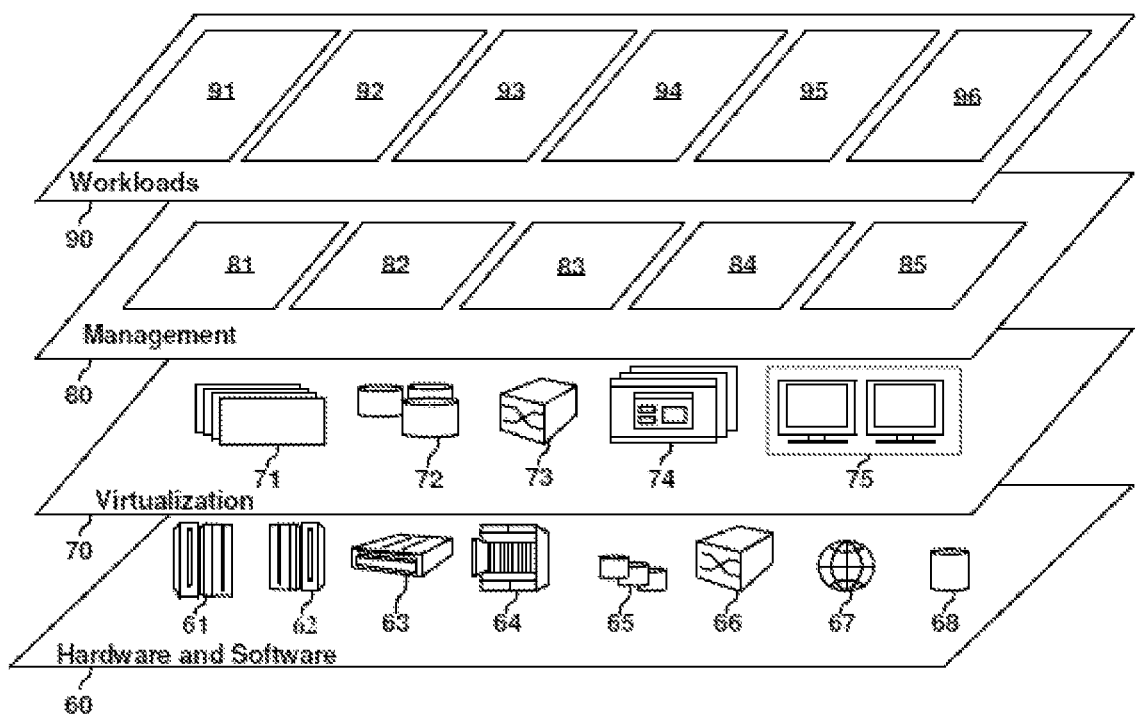
FIG. 5 depicts abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and personalizing installation protocols 96.

Figure 6:
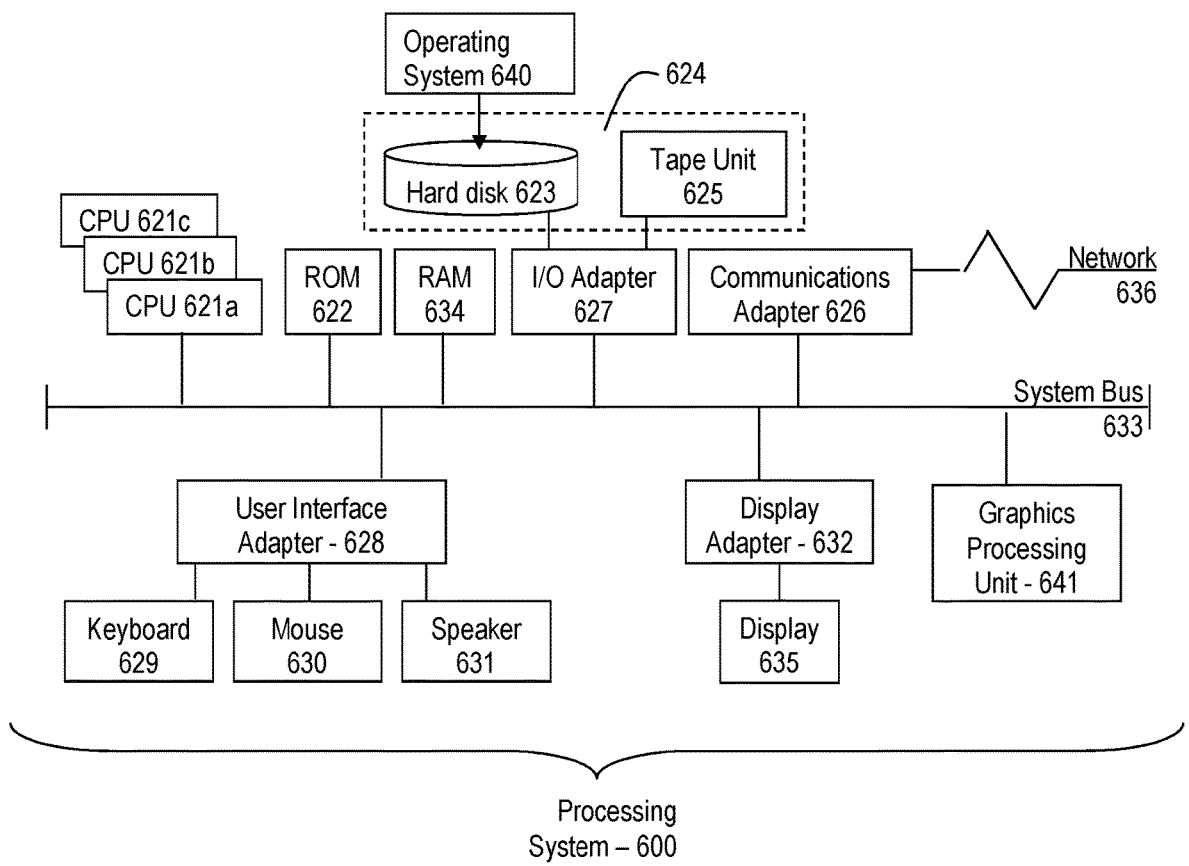
FIG. 6 depicts a block diagram of a computer system for use in implementing one or more embodiments of the present invention.

It is understood that the present disclosure is capable of being implemented in conjunction with any other type of computing environment now known or later developed. For example, FIG. 6 depicts a block diagram of a processing system 600 for implementing the techniques described herein. In examples, the processing system 600 has one or more central processing units (processors) 621a, 621b, 621c, etc. (collectively or generically referred to as processor(s) 621 and/or as processing device(s)). In aspects of the present disclosure, each processor 621 can include a reduced instruction set computer (RISC) microprocessor. Processors 621 are coupled to system memory (e.g., random access memory (RAM) 624) and various other components via a system bus 633. Read only memory (ROM) 622 is coupled to system bus 633 and may include a basic input/output system (BIOS), which controls certain basic functions of the processing system 600.

Further depicted are an input/output (I/O) adapter 627 and a network adapter 626 coupled to the system bus 633. I/O adapter 627 may be a small computer system interface (SCSI) adapter that communicates with a hard disk 623 and/or a storage device 625 or any other similar component. I/O adapter 627, hard disk 623, and storage device 625 are collectively referred to herein as mass storage 634. Operating system 640 for execution on processing system 600 may be stored in mass storage 634. The network adapter 626 interconnects system bus 633 with an outside network 636 enabling processing system 600 to communicate with other such systems.

A display (e.g., a display monitor) 635 is connected to the system bus 633 by display adapter 632, which may include a graphics adapter to improve the performance of graphics intensive applications and a video controller. In one aspect of the present disclosure, adapters 626, 627, and/or 632 may be connected to one or more I/O busses that are connected to the system bus 633 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 633 via user interface adapter 628 and display adapter 632. An input device 629 (e.g., a keyboard, a microphone, a touchscreen, etc.), an input pointer 630 (e.g., a mouse, trackpad, touchscreen, etc.), and/or a speaker 631 may be interconnected to system bus 633 via user interface adapter 628, which may include, for example, a Super I/O chip integrating multiple device adapters into a single integrated circuit In some aspects of the present disclosure, the processing system 600 includes a graphics processing unit 637. Graphics processing unit 637 is a specialized electronic circuit designed to manipulate and alter memory to accelerate the creation of images in a frame buffer intended for output to a display. In general, graphics processing unit 637 is very efficient at manipulating computer graphics and image processing and has a highly parallel structure that makes it more effective than general-purpose CPUs for algorithms where processing of large blocks of data is done in parallel.

Thus, as configured herein, the processing system 600 includes processing capability in the form of processors 621, storage capability including system memory (e.g., RAM 624), and mass storage 634, input means such as keyboard 629 and mouse 630, and output capability including speaker 631 and display 635. In some aspects of the present disclosure, a portion of system memory (e.g., RAM 624) and mass storage 634 collectively store the operating system 640 to coordinate the functions of the various components shown in the processing system 600.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    retrieving, using a processor, an installation protocol for a sensor-based device during an installation of the sensor-based device;
    receiving, using the processor, negative feedback data representing negative feedback about directions for a step in the installation protocol;
    searching, using the processor, a dependency graph for the installation protocol, wherein the dependency graph includes a plurality of installation protocol paths, wherein each node of the dependency graph represents a respective state of sensor-based device, and wherein each edge of the dependency graph represents a respective step of the installation protocol;
    retrieving, using the processor, alternate directions for the step in the installation protocol from the dependency graph; and
    amending, using the processor and during the installation of the sensor-based device, the installation protocol to include the alternate directions, based at least in part on the installation analysis.

2. The computer-implemented method of claim 1 further comprising:
    retrieving an electronic manual comprising installation steps for the sensor-based device; and
    generating the installation protocol based on the electronic manual.

3. The computer-implemented method of claim 1 further comprising:
    clustering a plurality of installation protocols based at least in part on at least one feature of the sensor-based device.

4. The computer-implemented method of claim 1, wherein the installation analysis comprises determining an experience of a first technician.

5. The computer-implemented method of claim 1, wherein the installation analysis comprises determining a resource available to a first technician.

6. The computer-implemented method of claim 1 further comprising:
    further amending the direction by including a hint generated by a second technician for completing the step.

7. The computer-implemented method of claim 1 further comprising providing the amended installation protocol to a first technician prior to completion of the installation.

8. A system comprising:
    a memory having computer readable instructions; and one or more processors for executing the computer readable instructions, the computer readable instructions controlling the one or more processors to perform operations comprising:

retrieving an installation protocol for a sensor-based device during an installation of the sensor-based device;

receiving, using the processor, negative feedback data representing negative feedback about directions for a step in the installation protocol;

searching a dependency graph for the installation protocol, wherein the dependency graph includes a plurality of installation protocol paths, wherein each node of the dependency graph represents a respective state of sensor-based device, and wherein each edge of the dependency graph represents a respective step of the installation protocol;

retrieving alternate directions for the step in the installation protocol from the dependency graph; and amending, during the installation of the sensor-based device, the installation protocol to include the alternate directions, based at least in part on the installation analysis.

9. The system of claim 8, the operations further comprising:

retrieving an electronic manual comprising installation steps for the sensor-based device; and generating the installation protocol based on the electronic manual.

10. The system of claim 8, the operations further comprising:

clustering a plurality of installation protocols based at least in part on at least one feature of the sensor-based device.

11. The system of claim 8, wherein the installation analysis comprises determining an experience of the first technician.

12. The system of claim 8, wherein the installation analysis comprises determining a resource available to the first technician.

13. The system of claim 8, wherein the operations further comprise further amending the direction by including a hint generated by a second technician for completing the step.

14. The system of claim 8, wherein the operations further comprise providing the amended installation protocol to the first technician prior to completion of the installation.

15. A computer program product comprising a computer readable storage medium having program instructions embodied therewith, the program instructions executable by a processor to cause the processor to perform operations comprising:

retrieving an installation protocol for a sensor-based device during an installation of the sensor-based device;

receiving, using the processor, negative feedback data representing negative feedback about directions for a step in the installation protocol;

searching a dependency graph for the installation protocol, wherein the dependency graph includes a plurality of installation protocol paths, wherein each node of the dependency graph represents a respective state of sensor-based device, and wherein each edge of the dependency graph represents a respective step of the installation protocol;

retrieving alternate directions for the step in the installation protocol from the dependency graph; and amending, during the installation of the sensor-based device, the installation protocol to include the alternate directions, based at least in part on the installation analysis.

16. The computer program product of claim 15, the operations further comprising:

retrieving an electronic manual comprising installation steps for the sensor-based device; and generating the installation protocol based on the electronic manual.

17. The computer program product of claim 15, wherein the operations further comprise clustering a plurality of installation protocols based at least in part on at least one feature of the sensor-based device.

18. The computer program product of claim 15, wherein the installation analysis comprises determining an experience of the first technician.

19. The computer program product of claim 15, wherein the installation analysis comprises determining a resource available to the first technician.

20. The computer program product of claim 15, wherein the operations further comprise further amending the direction by including a hint generated by a second technician for completing the step.

* * * * *